United States Patent
Navda et al.

(10) Patent No.: US 9,730,037 B2
(45) Date of Patent: Aug. 8, 2017

(54) CELLULAR DATA COMMUNICATION FOR MOBILE DEVICES

(75) Inventors: Vishnu Navda, Bangalore (IN); Ramachandran Ramjee, Bangalore (IN); Venkata N. Padmanabhan, Bangalore (IN); Ashish Sharma, Santa Barbara, CA (US)

(73) Assignee: MICROSOFT CORPORATION, Redmond, WA (US)

( * ) Notice: Subject to any disclaimer, the term of this patent is extended or adjusted under 35 U.S.C. 154(b) by 1132 days.

(21) Appl. No.: 12/816,388

(22) Filed: Jun. 16, 2010

(65) Prior Publication Data

US 2011/0314121 A1 Dec. 22, 2011

(51) Int. Cl.
*G06F 15/16* (2006.01)
*H04W 4/18* (2009.01)
*H04L 29/08* (2006.01)

(52) U.S. Cl.
CPC .............. *H04W 4/18* (2013.01); *H04L 67/02* (2013.01); *H04L 67/04* (2013.01); *H04L 67/289* (2013.01); *H04L 67/2838* (2013.01); *H04L 67/2842* (2013.01); *H04L 67/10* (2013.01)

(58) Field of Classification Search
USPC .......................................................... 709/217
See application file for complete search history.

(56) References Cited

U.S. PATENT DOCUMENTS

| | | | |
|---|---|---|---|
| 7,925,708 B2* | 4/2011 | Davis et al. ................. 709/206 |
| 8,032,508 B2* | 10/2011 | Martinez et al. ............. 707/708 |
| 8,112,471 B2* | 2/2012 | Wei et al. ..................... 709/202 |
| 8,234,372 B2* | 7/2012 | Knapp et al. ................ 709/224 |
| 8,260,913 B2* | 9/2012 | Knapp et al. ................ 709/224 |
| 2005/0234928 A1* | 10/2005 | Shkvarchuk ........ H04L 67/2823 |
| 2006/0160508 A1 | 7/2006 | Narayanaswami et al. |
| 2006/0193295 A1 | 8/2006 | White et al. |
| 2007/0266173 A1 | 11/2007 | Wong et al. |
| 2008/0165701 A1 | 7/2008 | Ananthanarayanan et al. |
| 2009/0310617 A1 | 12/2009 | Harris et al. |
| 2010/0250497 A1* | 9/2010 | Redlich et al. .............. 707/661 |
| 2010/0332818 A1* | 12/2010 | Prahlad et al. .............. 713/150 |
| 2012/0026992 A1* | 2/2012 | Navda et al. ................. 370/338 |
| 2012/0036220 A1* | 2/2012 | Dare et al. ................... 709/217 |
| 2012/0084665 A1* | 4/2012 | Bookstaff ..................... 715/748 |

OTHER PUBLICATIONS

Mah, Paul., "Internet access on the go with your BlackBerry and TetherBerry", Retrieved at <<http://blogs.techrepublic.com.com/networking/?p=1810 >>, Aug. 10, 2009, pp. 4.

(Continued)

*Primary Examiner* — Hua Fan (57) ABSTRACT

A method for managing data communication of a mobile device in a mobile network is provided. The method may include receiving a request, at a cloud proxy, to retrieve Internet data from the Internet. The request may originate from an application, and the Internet data may have a plurality unique objects. The method may also include aggregating the Internet data and two or more of the unique objects from the Internet. Furthermore, the method may include forwarding the Internet data and the two or more unique objects to the mobile device in one transmission.

20 Claims, 4 Drawing Sheets

(56) References Cited

OTHER PUBLICATIONS

Anastasi, et al., "Experimental Analysis of an Application-independent Energy Management", Retrieved at <<http://ieeexplore.ieee.org/stamp/stamp.jsp?tp=&arnumber=1358449&userType=inst >>, ISCC, Proceedings of the Ninth International Symposium on Computers and Communications, (ISCC"04), vol. 2, Jun. 28-Jul. 1, 2004, pp. 6.

Anastasi, et al., "802.11 Power-Saving Mode for Mobile Computing in Wi-Fi hotspots: Limitations, enhancements and Open Issues", Retrieved at <<http://info.iet.unipi.it/~anastasi/papers/winet07.pdf >>, Wireless Networks, vol. 14, No. 6, Dec. 2008, pp. 1-28.

Icjackson., "Turn Your Windows Mobile Phone Into a WiFi Hot Spot with WMWiFiRouter", Retrieved at http://www.mobiletopsoft.com/board/5321/turn-your-windows-mobile-phone-into-a-wifi-hot-spot-with-wmwifirouter.html >>, Apr. 19, 2009, pp. 2.

Wang, Yin., "Distributed Diversity in Hybrid Wireless Networks", Retrieved at <<http://www.ccs.neu.edu/home/ryanwang/proposal.pdf >>, Nov. 2009, pp. 26.

"The Indian Telecom Services Performance Indicator Report for the Quarter ending Jun. 2009", Retrieved at <<http://www.trai.gov.in/WriteReadData/trai/upload/Reports/48/IndicatorReport1oct09.pdf >>, Oct. 1, 2009, pp. 142.

Anand, et al., "Self-Tuning Wireless Network Power Management", Retrieved at <<http://notrump.eecs.umich.edu/papers/mobicom03.pdf >>, International Conference on Mobile Computing and Networking, Proceedings of the 9th annual international conference on Mobile computing and networking, Sep. 14-19, 2003, pp. 14.

Ananthanarayanan, et al., "COMBINE: Leveraging the Power of Wireless Peers through Collaborative downloading", Retrieved at <<http://www.usenix.org/events/mobisys07/full_papers/p286.pdf >>, International Conference on Mobile Systems, Applications and Services, Proceedings of the 5th international conference on Mobile systems, applications and services, Jun. 11-14, 2007, pp. 286-298.

Barford, et al., "Generating Representative Web Workloads for Network and Server Performance Evaluation", Retrieved at <<http://cs-www.bu.edu/faculty/crovella/paper-archive/sigm98-surge.pdf >>, In Proceedings of the ACM SIGMETRICS International Conference on Measurement and Modeling of Computer Systems, Jul. 1998, pp. 10.

Carter, et al., "User Devices Cooperating to Support Resource Aggregation", Retrieved at <<http://citeseerx.ist.psu.edu/viewdoc/summary?doi=10.1.1.12.6750 >>, WMCSA, Proceedings of the Fourth IEEE Workshop on Mobile Computing Systems and Applications, Jun. 20-21, 2002, pp. 1-11.

Chakravorty, et al., "GPRSWeb: Optimizing the Web for GPRS Links", Retrieved at <<http://citeseerx.ist.psu.edu/viewdoc/summary?doi=10.1.1.12.7665 >>, International Conference on Mobile Systems, Applications and Services, Proceedings of the 1st international conference on Mobile systems, applications and services, May 5-8, 2003, pp. 14.

Fielding, et al., "Hypertext Transfer Protocol—HTTP/1.1. RFC 2616", Retrieved at <<http://www.w3.org/Protocols/rfc2616/rfc2616.html >>, Jun. 1999, pp. 6.

Housel, et al., "WebExpress: A System for Optimizing Web Browsing in a Wireless Environment.", Retrieved at <<http://doi.acm.org/10.1145/236387.236416 >>, International Conference on Mobile Computing and Networking, Proceedings of the 2nd annual international conference on Mobile computing and networking, 1996, pp. 108-116.

Hsieh, et al., "A Transport Layer Approach for Achieving Aggregate Bandwidth on Multi-homed Mobile Hosts", Retrieved at <<http://www.sigmobile.org/mobicom/2002/papers/p035-hsieh.pdf >>, International Conference on Mobile Computing and Networking, Proceedings of the 8th annual international conference on Mobile computing and networking, Sep. 23-28, 2002, pp. 12.

Hui, et al., "Bubble Rap: Forwarding in Small World DTNs in Ever Decreasing Circles. Tech. rep", Retrieved at <<http://www.cl.cam.ac.uk/techreports/UCAM-CL-TR-684.pdf >>, Technical Report, UCAM-CL-TR-684, No. 684, May 2007, pp. 44.

Joseph, et al., "Rover: A Toolkit for Mobile Information Access", Retrieved at <<http://citeseerx.ist.psu.edu/viewdoc/summary?doi=10.1.1.12.9061 >>, ACM Symposium on Operating Systems Principles, Proceedings of the fifteenth ACM symposium on Operating systems principles, Dec. 3-6, 1995, pp. 156-171.

Kim, et al., "Improving TCP Performance over Wireless Networks with Collaborative Multi-homed Mobile Hosts", Retrieved at <<http://www.usenix.org/events/mobisys05/tech/full_papers/kim/kim.pdf >>, International Conference on Mobile Systems, Applications and Services, Proceedings of the 3rd international conference on Mobile systems, applications and services, Jun. 6-8, 2005, pp. 107-120.

Kistler, et al., "Disconnected Operation in the Coda File System", Retrieved at <<http://www.cs.cmu.edu/~coda/docdir/s13.pdf >>, ACM Transactions on Computer Systems, vol. 10, No. 1, Feb. 1992, pp. 3-25.

Liljeberg, et al., "Mowgli WWW Software: Improved Usability of WWW in Mobile WAN Environments", Retrieved at <<ieeexplore.ieee.org/iel3/4477/12739/00586111.pdf?arnumber=586111 >>, In IEEE Global Internet, IEEE Communications Society, Nov. 1996, pp. 33-37.

Luo, et al., "UCAN: A Unified Cellular and Ad-hoc Network Architecture", Retrieved at <<http://citeseerx.ist.psu.edu/viewdoc/download;jsessionid=05C4B7C7100F738E419DB478F76B6A07?doi=10.1.1.2.9171&rep=rep1&type=pdf. >>, International Conference on Mobile Computing and Networking, Proceedings of the 9th annual international conference on Mobile computing and networking, Sep. 14-19, 2003, pp. 15.

Noble, et al., "Experience with Adaptive Mobile Applications in Odyssey", Retrieved at <<http://130.203.133.121:8080/viewdoc/download;jsessionid=B82EADEA24CA7FB7D7BF9C1F87C7163F?doi=10.1.1.42.8842&rep=rep1&type=pdf >>, Mobile Networks and Applications, vol. 4, No. 4, Dec. 1999, pp. 245-254.

Pering, et al., "CoolSpots: Reducing the Power Consumption of Wireless Mobile Devices with Multiple Radio Interfaces", Retrieved at <<http://www.usenix.org/events/mobisys06/full_papers/p220-pering.pdf >>, International Conference on Mobile Systems, Applications and Services, Proceedings of the 4th international conference on Mobile systems, applications and services, Jun. 19-22, 2006, pp. 220-232.

Qureshi, et al., "Horde: Separating Network Striping Policy from Mechanism", Retrieved at <<http://www.usenix.org/events/mobisys05/tech/full_papers/qureshi/qureshi.pdf >>, International Conference on Mobile Systems, Applications and Services, Proceedings of the 3rd international conference on Mobile systems, applications and services, Jun. 6-8, 2005, pp. 121-134.

Rodriguez, et al., "A Commuter Router Infrastructure for the Mobile Internet", Retrieved at <<http://www.cs.wisc.edu/~suman/pubs/mobisys04.pdf >>, International Conference on Mobile Systems, Applications and Services, Proceedings of the 2nd international conference on Mobile systems, applications, and services, Jun. 6-9, 2004, pp. 14.

Schroeder, et al., "Open Versus Closed: A Cautionary Tale", Retrieved at <<http://www.cs.caltech.edu/~adamw/papers/openvsclosed.pdf >>, Proceedings of the 3rd conference on Networked Systems Design & Implementation, vol. 3, May 8-10, 2006, pp. 14.

Sharma, et al., "Handheld Routers: Intelligent Bandwidth Aggregation for Mobile Collaborative Communities", Retrieved at http://www.hpl.hp.com/techreports/2003/HPL-2003-37R1.pdf >>, BROADNETS, Proceedings of the First International Conference on Broadband Networks, Oct. 25-29, 2004, pp. 16.

Snoeren, Alex C., "Adaptive Inverse Multiplexing for Wide-Area Wireless Networks", Retrieved at <<ieeexplore.ieee.org/iel5/6675/17997/00832447.pdf?arnumber=832447 >>, In IEEE conference on Global Communications, 1999, pp. 1665-1672.

* cited by examiner

CELLULAR DATA COMMUNICATION FOR MOBILE DEVICES

BACKGROUND

As cellular networks and coverage around the world grow, the popularity of cellular devices has greatly increased. In particular, usage of Internet based mobile applications on smartphones has experienced a drastic increase as well. However, these applications tend to consume relatively large amounts of energy compared to the battery life of their corresponding devices. Indeed, many such applications, such as web browsers, are designed to constantly access the cellular network and/or the Internet.

The main contributor to such large energy drains remains the devices' cellular radios. To this end, radios are typically needed to provide the link between a device and a network so that the aforementioned applications can access the Internet. In some cases, the radios add a factor of five or more times the energy cost of their base devices.

SUMMARY

Described herein are implementations of various technologies for managing mobile device in a mobile network. As mentioned above, cellular radios may prove to be relatively large energy drains in a mobile device. As such, various technologies described herein may generally seek to reduce the energy consumed by the cellular radios by managing mobile data communication. Furthermore, the various technologies herein may apply to a mobile device directly communicating with the Internet for its own purposes or to the mobile device providing an Internet connection for a client device.

At a high level, several aspects of managing mobile devices in a mobile network are encompassed within the various technologies described herein. A first aspect may focus on a cloud proxy to facilitate communication between the mobile device and the Internet. Typically, Internet data may contain various unique objects (e.g., Flash plugins, media files, Java applets). In some instances, particularly with reference to HTTP, the unique objects may be referred to as embedded objects. To this end, various applications, stored either on the mobile device or the client device, usually issue separate requests to one or more Internet servers to download the Internet data and its unique objects. Internet data may include web page, emails, instant messages, streaming video, streaming audio, and the like. Applications may include web browsers, instant messengers, media players, email clients, and the like. Typically, unique objects can reside on multiple servers and separate requests may be made to each server to retrieve the unique objects. Furthermore, each request may be satisfied in separate transmissions to the mobile device. Such transmissions can cause the radios of the mobile device to remain active for relatively long periods of time, thereby draining energy.

Therefore, various technologies described herein may provide for a cloud proxy. In general, the cloud proxy may be deployed in different locations depending on various situations. For example, the cloud proxy could be deployed in a public cloud to serve as a point of control. In another instance, the cloud proxy could be deployed in an operator cloud to add value to operators such as reduced network bandwidth. Additionally, the cloud proxy could be deployed as a personal proxy such as in a home networking scenario to eliminate privacy risks and extend network capabilities for mobile device.

In one implementation, the cloud proxy may receive an initial request for Internet data from the mobile device and may proactively gather or download all of the unique objects associated with the Internet data. Once the Internet data and unique objects have been downloaded, the cloud proxy may send all this data back to mobile device (or through the mobile device to the client device) in one transmission. Thus, multiple transmissions to the mobile device may no longer be required to download unique objects of Internet data. As a result, the radio of the mobile device may be less active, thus saving energy in the mobile device for other tasks.

A second aspect may focus on implementations where the Internet data is a web page and the application is a web browser. To this end, an assembler may be stored either on the mobile device or on the client device. The assembler may manage requests from the web browser as well as incoming data from the cloud proxy or mobile device. To this end, when the assembler receives a request for an object from the web browser, the assembler may first determine whether the request is for a new web page or for an unique object in the current web page. If the request is for a new web page, the assembler may simply forward the request to the cloud proxy.

If the request is for an unique object on the current web page, the assembler may determine whether the current web page and its unique objects have already been transmitted by the cloud proxy. If so, the assembler may match the unique object to the request and serve the unique object to the web browser. If not, the assembler may suspend the request until the current web page and its unique objects have been received.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, various techniques described herein are directed to managing a data communication of a mobile device in a mobile network. Those techniques will be described in more detail with reference to FIGS. 1-4.

Figure 1:
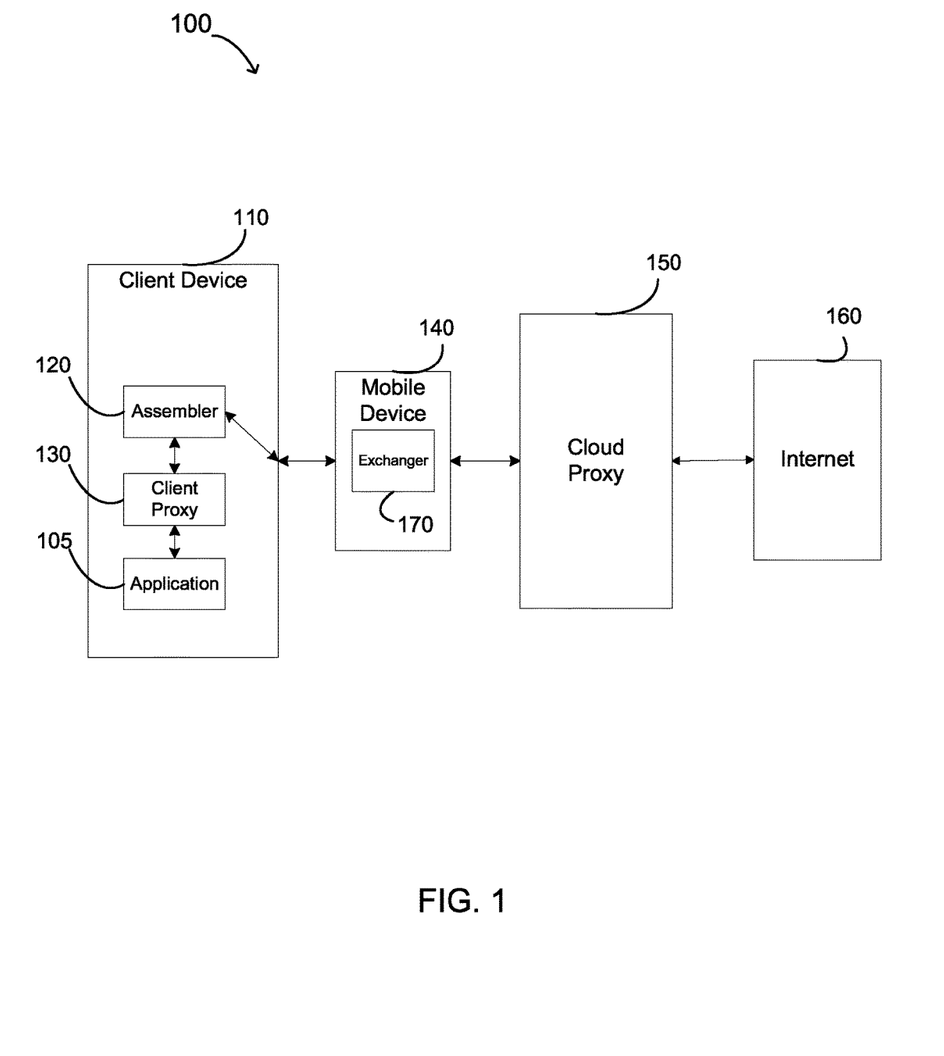
FIG. 1 illustrates a schematic diagram of a mobile network in which the various techniques described herein may be incorporated and practiced.

FIG. 1 illustrates a schematic diagram of a mobile network 100 in which the various technologies described herein may be incorporated and practiced. The mobile network 100 may illustrate one implementation for tethering. As used herein, tethering may refer to the idea of using a mobile device (e.g., a cell phone) as a modem or Internet gateway to supply Internet access to another device. As such, the mobile network 100 may include a client device 110, a mobile device 140, a cloud proxy 150, and the Internet 160. The client device 110 may also have an application 105, an assembler 120 and a client proxy 130. In one implementation, the application 105 may be a web browser.

The following provides a general description of the function of the components illustrated in FIG. 1. More detailed descriptions are subsequently provided with reference to FIG. 2 and FIG. 3. The client device 100 may include any type of computer such as a laptop computer, notebook computer, personal data assistant (PDA), or the like. In general, the client proxy 130 may act as an intermediary between an application 105 stored on the client device 110 and any other devices. For example, if the application 105 is a web browser making a request for a web page, this request may be forwarded to the client proxy 130. The assembler 120 may generally match requests from the client proxy 130 with incoming responses from the mobile device 140.

The mobile device 140 itself may serve as an Internet gateway for the client device 110. To this end, the mobile device 140 may include an exchanger 170. In one implementation, the exchanger 170 may serve as a byte-level forwarder. In other words, the exchanger 170 may enable the mobile device 140 to facilitate data communication between the client device 140 and the cloud proxy 150.

The cloud proxy 150 may be used to gather Internet data requested by the mobile device 140 and send such data back to the mobile device 140 in a single transmission. Internet data may include web page, emails, instant messages, streaming video, streaming audio, and the like. Additionally, Internet data may be associated with unique objects including, but not limited to, Flash plugins, media files, and Java applets. Furthermore, in the context of Hypertext Transfer Protocol (HTTP), unique objects may be referred to as embedded objects. Application 105 may include web browsers, instant messengers, media players, email clients, and the like.

In a tethered scenario, the request may originate from the client device 110 (or an application 105 stored thereon), and the mobile 140 may forward the data back to the client device 110 after having received it from the cloud proxy 150. For instance, the client proxy 130 may issue a request from the application 105 to the assembler 120 to retrieve Internet data. Depending on certain factors, which will be described in FIG. 2, the assembler 120 may send the request onto the mobile device 140. The mobile device 140 may then forward the request to the cloud proxy 150, which may proactively fetch all data from the Internet 160, such as unique objects, related to the Internet data. Once the cloud proxy 150 has gathered or aggregated all such data, the cloud proxy 150 may send the data back to the mobile device 140 in one transmission.

The mobile device 140 may then forward the data back to the assembler 120 on the client device 110. As described in more detail in FIG. 3, the assembler 120 may then serve parts of the data to the client proxy 130 as the client proxy 130 issues requests for the data.

In another implementation, the mobile device 140 may maintain a HTTP persistent connection with the cloud proxy 150. As such, the mobile device 140 may avoid the overhead in setting up a new connection every time it makes a request to the cloud proxy 150.

In a further implementation, multiple applications 105 may reside on the client device 110, and each application may make certain requests for Internet data and associated unique data. As such, the client proxy 130 may gather or aggregate all the requests and send the requests to the cloud proxy 150 in one transmission. Then, the cloud proxy 150 may gather all corresponding responses (e.g., Internet data and unique objects) to the requests and send the requests back through the mobile device 140 to the client device 110 in another single transmission.

Figure 2:
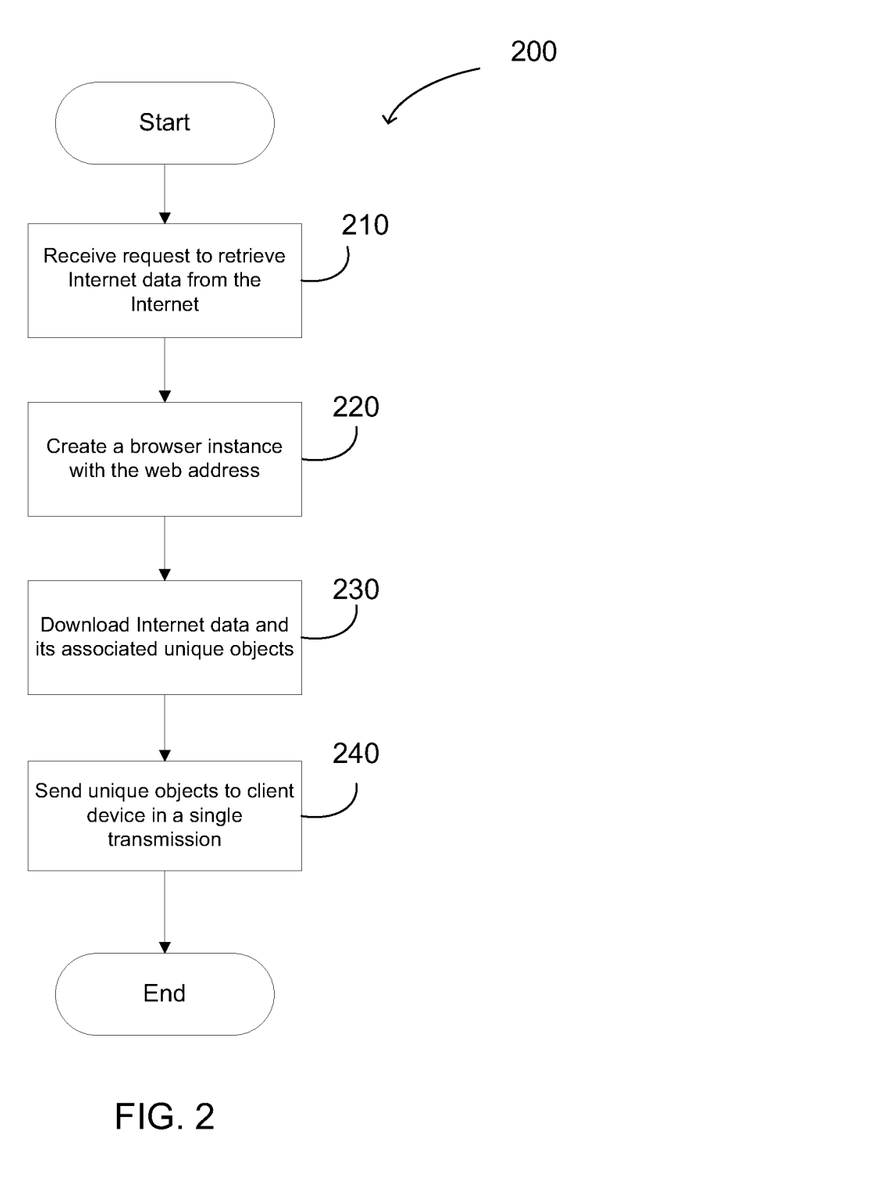
FIG. 2 illustrates a flow diagram of a method for managing data communication of a cloud proxy in a mobile network in accordance with one or more implementations of various techniques described herein.

FIG. 2 illustrates a flow diagram of a method 200 for managing data communication of a cloud proxy in the mobile network 100 in accordance with one or more implementations of various techniques described herein. The following description of method 200 is made with reference to the mobile network 100 of FIG. 1. It should be understood that while method 200 indicates a particular order of execution of the operations, in some implementations, certain portions of the operations might be executed in a different order. Furthermore, method 200 may be performed by the cloud proxy 150.

At step 210, the cloud proxy 150 may receive a request from the client device 110 to retrieve Internet data. In one implementation, the Internet data may include a particular web page associated with a web address (e.g., URL). Such a request may originate from the application 105, e.g., a web browser stored on the client device 110. The request may then be sent to the mobile device 140, which may forward the request to the cloud proxy 150.

In an implementation where the Internet data includes a web page and the application 105 is a web browser, the cloud proxy 150 may create a browser instance having the web address at step 220. The browser instance may be created since the cloud proxy 150 may not have the same web browser stored on the client device 110. Therefore, the browser instance may mimic certain functions of the web browser of the client device 110, such as issuing requests for the web page to an Internet server. In one implementation, the browser instance may be created having the same web address, cookie information, and other parameters used by the web browser at the time of receiving the request in step 210.

Then, in step 230, the cloud proxy 150 may aggregate the Internet data. The aggregation may include downloading any unique objects associated with the Internet data. Unique objects may be composed of various data, such as media files, Flash plugins, Java applets and the like. Additionally, the unique objects can originate from different sources (e.g., different servers) across the Internet 160. For example, if the Internet data were a web page, the unique objects may be referred to as embedded objects, and the embedded objects may be stored on various servers across the Internet 160.

At step 240, the cloud proxy may forward or send the Internet data along with its associated unique objects back through the mobile device 140, which may then forward the data to the client device 110. In one implementation, this transfer may be performed as a single transmission to reduce energy consumption of the mobile device 140. In another implementation, two or more of the unique objects may be aggregated in step 230 and then forwarded through the mobile device 140 to the client device 110 in one transmission in step 240. This may be in contrast to aggregating all unique objects and then forwarding them, which may take too long depending on the time constraints of the application 105 or a user.

Moreover, each of the two or more unique objects may reside on different Internet servers. The rest of the unique objects may then be forwarded in one or more separate transmissions. By forwarding two or more unique objects in one transmission, the number of overall transmission may be reduced while still meeting any time requirements of the application 105 and/or a user. For example, an instant messaging application or a user of such may desire messages to be sent and received within a given amount of time. Furthermore, while FIG. 2 has been illustrated with some references to a web browser requesting a web page, it should be understood that all types of Internet data and applications are also contemplated within the various technologies disclosed herein.

Figure 3:
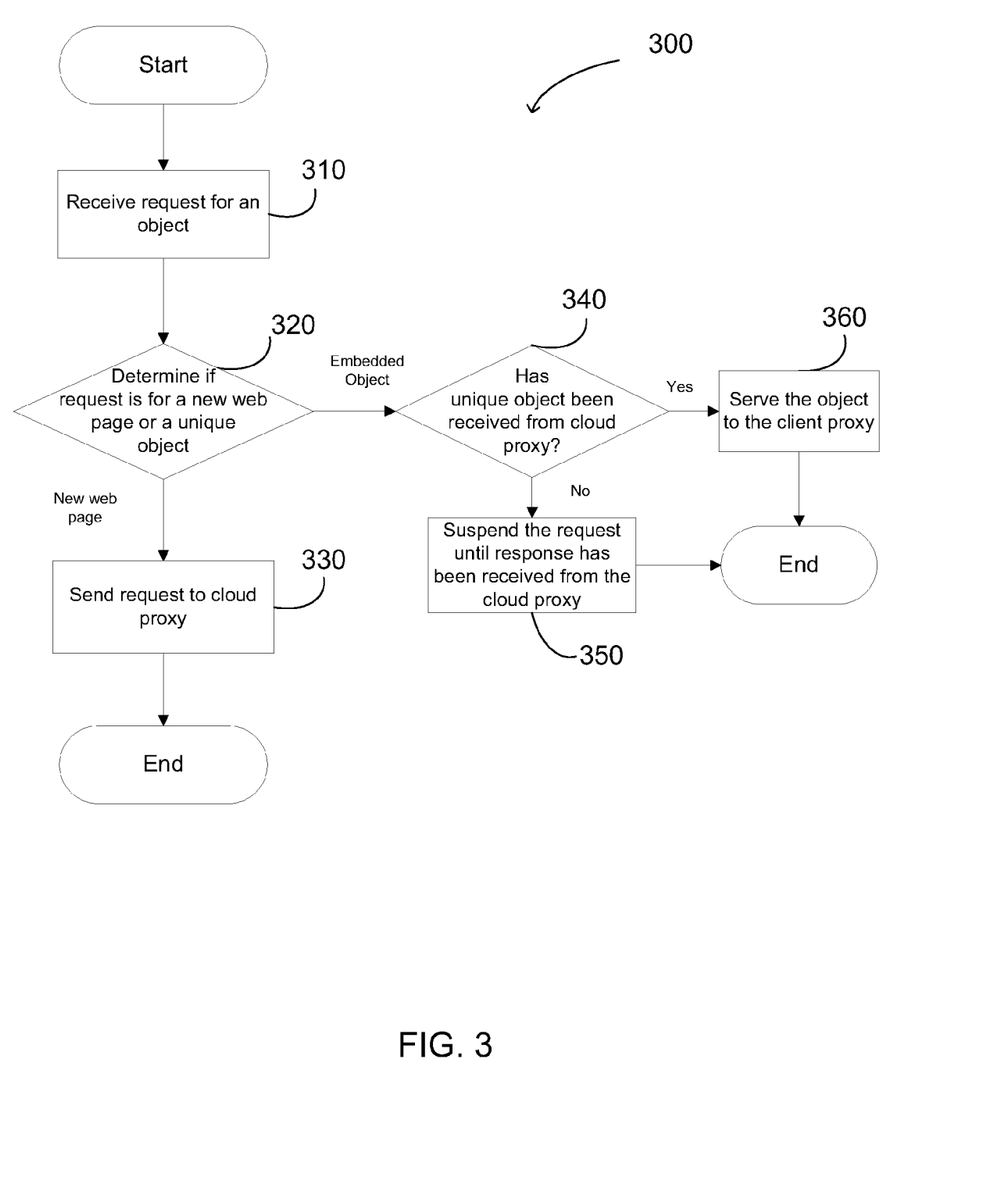
FIG. 3 illustrates a flow diagram of a method for managing data communication of a mobile device in a mobile network in accordance with one or more implementations of various techniques described herein.

FIG. 3 illustrates a flow diagram of a method 300 for managing data communication of a mobile device in a mobile network 100 in accordance with one or more implementations of various techniques described herein. The following description of method 300 is made with reference to the mobile network 100 of FIG. 1. It should be understood that while method 300 indicates a particular order of execution of the operations, in some implementations, certain portions of the operations might be executed in a different order. Furthermore, method 300 may be performed by the client device 110 and may be described according to an implementation where the application 105 may be a web browser, and the Internet data may include a web page.

At step 310, the assembler 120 may receive a request from the client proxy 130 for an object. In one implementation, the request may originate from the web browser stored on the mobile device 110. To this end, the web browser may be in communication with the client proxy 130, and the client proxy 130 may act as an intermediary between the web browser and any other device or application.

At step 320, the assembler 120 may determine if the request is for a new web page or for an unique object for a previously requested web page. If the request is for a new web page, the assembler may forward or send the request to the cloud proxy 150 (step 330).

If the request is for an unique object of previously requested web page, then this means that the client proxy 130 has already previously made the request for the current web page. In this situation, the assembler 120 would have already sent such a request to the cloud proxy 150 at step 330. As a result, the cloud proxy 150 may have already responded with the downloaded web page and unique objects or may be in the process of retrieving the web page and unique objects. Therefore, at step 340, the assembler 120 may determine whether the unique object has already been received from the cloud proxy 150.

At step 350, if the unique object has not yet been received from the cloud proxy 150, the assembler 120 may suspend the client proxy's request for the unique object. To this end, the assembler 120 may be waiting for a response from the cloud proxy 150 in which the response contains the unique object. As described in FIG. 3, once the cloud proxy 150 has gathered all the data and unique objects in a web page, it may send the entire downloaded web page and its associated unique objects to the client device 110, i.e., the assembler 120, in one transmission. Thus, the requested unique object may be contained in the one transmission, and the assembler 120 may suspend all requests for the unique object until the one transmission has been received.

Therefore, separate and subsequent requests for particular unique objects may be rendered redundant. In other words, after an initial request for a web page by client proxy 130, all subsequent requests by the client proxy 130 for unique objects associated with the web page may be suspended. By preventing these requests from being directly communicated to the cloud proxy 150, resources from all components of the mobile network 100 may be preserved. In particular, the mobile device 140 may not have to constantly manage the communications between the client device 110 and the cloud proxy 150.

At step 360, if the response with the unique object has already been received from the cloud proxy 150, the assembler 120 may then serve the unique object immediately to the client proxy 130. The client proxy 130 may then serve the unique object to a web browser on the client device 110.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 4:
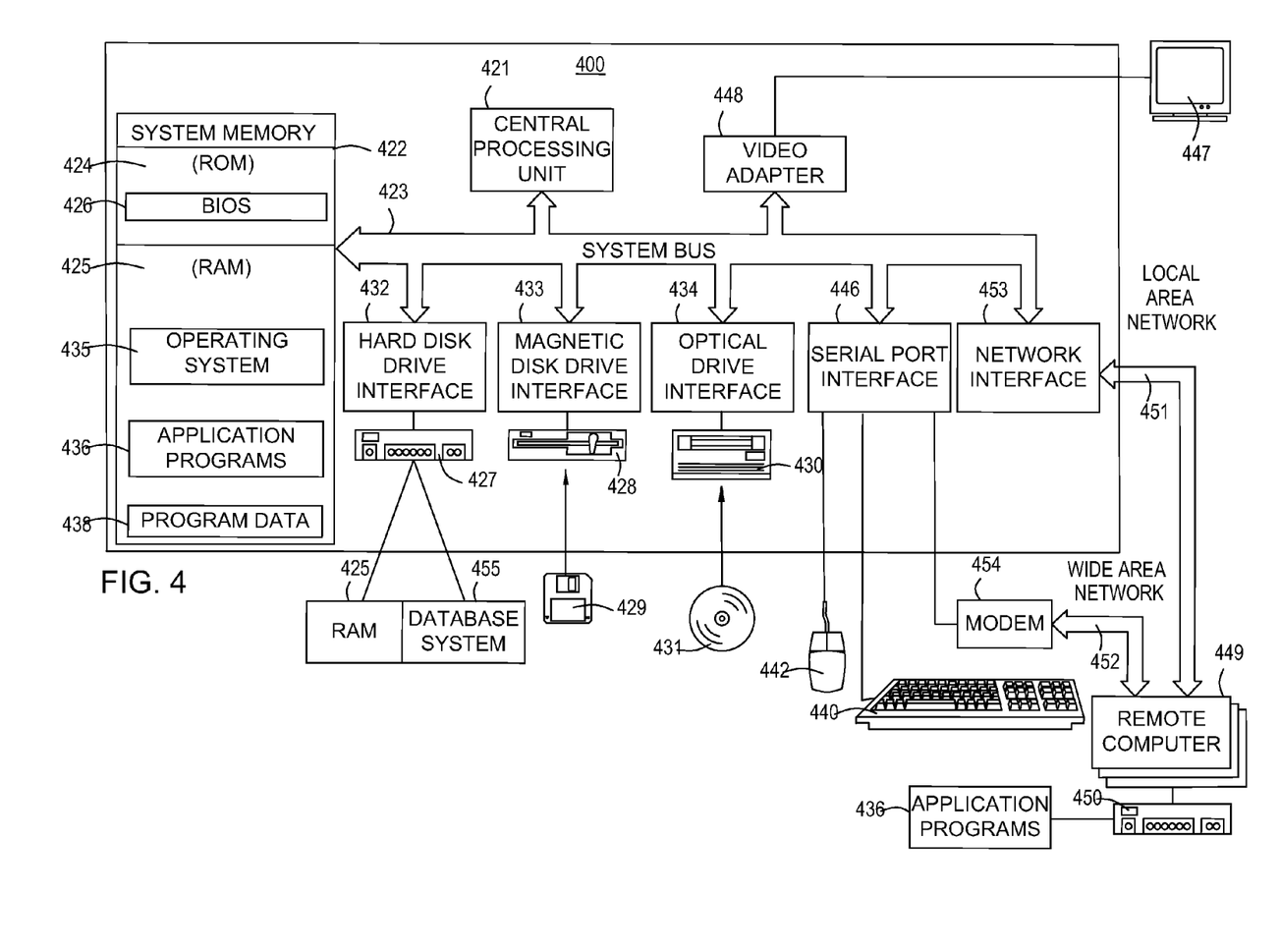
FIG. 4 illustrates a schematic diagram of a computing system in which the various techniques described herein may be incorporated and practiced.

FIG. 4 illustrates a schematic diagram of a computing system 400 in which the various technologies described herein may be incorporated and practiced. Although the computing system 400 may be a conventional desktop or a server computer, as described above, other computer system configurations may be used. The computing system 400 may be client device 110 or the mobile device 140.

The computing system 400 may include a central processing unit (CPU) 421, a system memory 422 and a system bus 423 that couples various system components including the system memory 422 to the CPU 421. Although only one CPU is illustrated in FIG. 4, it should be understood that in some implementations the computing system 400 may include more than one CPU. The system bus 423 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 422 may include a read only memory (ROM) 424 and a random access memory (RAM) 425. A basic input/output system (BIOS) 426, containing the basic routines that help transfer information between elements within the computing system 400, such as during start-up, may be stored in the ROM 424.

The computing system 400 may further include a hard disk drive 427 for reading from and writing to a hard disk, a magnetic disk drive 428 for reading from and writing to a removable magnetic disk 429, and an optical disk drive 430 for reading from and writing to a removable optical disk 431, such as a CD ROM or other optical media. The hard disk drive 427, the magnetic disk drive 428, and the optical disk drive 430 may be connected to the system bus 423 by a hard disk drive interface 432, a magnetic disk drive interface 433, and an optical drive interface 434, respectively. The drives and their associated computer-readable media may provide nonvolatile storage of computer-readable instructions, data structures, program modules and other data for the computing system 400.

Although the computing system 400 is described herein as having a hard disk, a removable magnetic disk 429 and a removable optical disk 431, it should be appreciated by those skilled in the art that the computing system 400 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 427, magnetic disk 429, optical disk 431, ROM 424 or RAM 425, including an operating system 435, one or more application programs 436, and program data 438. In one implementation, the application programs 436 may include applications configured to perform the steps in FIG. 2. In another implementation, the application programs 436 may include programs such as the assembler 120, the client proxy 130, and/or the application 105 to perform the steps illustrated in FIG. 3. The operating system 435 may be any suitable operating system that may control the operation of a networked personal or server computer, such as Windows® XP, Mac OS® X, Unix-variants (e.g., Linux® and BSD®), and the like.

A user may enter commands and information into the computing system 400 through input devices, such as a keyboard 440 and pointing device 442. Other input devices may include a microphone, joystick, game pad, satellite dish, scanner, or the like. These and other input devices may be connected to the CPU 421 through a serial port interface 446 coupled to system bus 423, but may be connected by other interfaces, such as a parallel port, game port or a universal serial bus (USB). A monitor 447 or other type of display device may also be connected to system bus 423 via an interface, such as a video adapter 448. In addition to the monitor 447, the computing system 400 may further include other peripheral output devices such as speakers and printers.

Further, the computing system 400 may operate in a networked environment using logical connections to one or more remote computers 449. The logical connections may be any connection that is commonplace in offices, enterprise-wide computer networks, intranets, and the Internet, such as local area network (LAN) 451 and a wide area network (WAN) 452. When using a LAN networking environment, the computing system 400 may be connected to the local network 451 through a network interface or adapter 453. When used in a WAN networking environment, the computing system 400 may include a modem 454, wireless router or other means for establishing communication over a wide area network 452, such as the Internet. The modem 454, which may be internal or external, may be connected to the system bus 423 via the serial port interface 446. In a networked environment, program modules depicted relative to the computing system 400, or portions thereof, may be stored in a remote memory storage device 450. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various technologies described herein may have an advantage of reducing energy consumption in a mobile device. Particularly, the various technologies described herein may reduce the tail energy overhead of a mobile device providing an Internet connection for a client device in a tethering scenario. Typically, after a mobile device has finished communicating with other devices using its wireless radio (e.g., its Wide Area Network (WAN) radio), its wireless radio may still remain active for a predetermined period of time before entering an idle state. As used herein, the tail energy overhead of a mobile device may refer to the energy consumed by its wireless radio during the predetermined period of time.

In conventional implementations where the application 105 is a web browser, desiring to retrieve a web page on the client device 110 may first download the main web page before downloading each of the unique objects on the web page. Moreover, the unique objects may be stored on different servers, requiring the web browser to issue separate requests for these unique objects. In a tethered scenario, issuing separate requests through the mobile device 140 may result in the mobile device 140 issuing separate, intermittent responses of data from the Internet back to the client device 110. As previously mentioned, each response by the mobile device 140 may be associated with tail energy overhead. In a worse case, the intermittent responses may be timed such that the mobile device's 140 wireless radio is kept in an active state for the duration of the web page download.

In accordance with various technologies described herein, the cloud proxy 150 may be used to gather or aggregate the web page and its associated unique objects and send the aggregated unique objects to the client device 110 through the mobile device 140 in one transmission. To this end, the cloud proxy 150 may create a browser instance to mimic requests made by the web browser to the various servers having the unique objects. As such, the requests issued by the web browser may be suspended or blocked from leaving the client device 110 by the client proxy 130. With the browser instance, the cloud proxy 150 may thereby be able to pre-fetch the unique objects from the Internet. In some instances, the unique objects may be fetched even before the requests for the unique objects are generated by the client device 110 and/or web browser. Thus, separate and intermittent request/response communications to and from the mobile device 140 for unique objects may be eliminated or significantly reduced for downloading a web page. As a result, tail energy overhead of the mobile device 140 may be significantly reduced. Indeed, the activity of the mobile device's 140 wireless radio may be restricted such that the wireless radio may only be active during the initial request sent by the mobile device 140 to the cloud proxy 150 and the subsequent response from the cloud proxy 150.

Further optimizations to the various technologies described herein may also be realized. For example, the assembler 120 could receive an unique object before a web browser or client proxy 130 has issued a request for the unique object. As such, the assembler 120 may temporarily store the unique object in memory until it has received an explicit request for the unique object.

Additionally, while various technologies described herein have been described with reference to a tethering framework between a mobile device and a client device, the various technologies can also be applied to a non-tethering framework. For example, method 200 and method 300 could also be applied in a network without a client device. In this scenario, the mobile device 140 itself may desire communication with the Internet. To this end, the assembler 120, the client proxy 130, and the web browser may be stored directly on the mobile device 140. Method 200 and method 300 may then be performed as previously described.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing data communication of a mobile device in a mobile network, comprising:
receiving one or more requests, at the mobile device from a client device, to retrieve Internet data having a plurality of unique objects;
forwarding the one or more requests from the mobile device to a cloud proxy;
aggregating at the cloud proxy the Internet data and two or more of the unique objects from the Internet;
forwarding the Internet data and the two or more unique objects from the cloud proxy to the mobile device in one transmission;
sending the Internet data and the two or more unique objects from the mobile device to the client device;
receiving an additional request at an assembler stored on the mobile device to retrieve Internet data;
determining if the additional request is for a new web page or a unique object of a previously requested web page;
forwarding the additional request to the cloud proxy if the additional request is for a new web page;
if the additional request is for a unique object of a previously requested web page, determining whether the assembler has received a transmission containing the unique object of the previously requested web page; and
if it is determined that the assembler has not received the unique object of the previously requested web page, preventing only requests for the unique object of the previously requested web page from being communicated to the cloud proxy until a transmission is received at the assembler containing the unique object of the previously requested web page.

2. The method of claim 1, wherein the one or more requests are received in one transmission.

3. The method of claim 1, wherein the mobile device maintains a Hypertext Transfer Protocol persistent connection with the cloud proxy.

4. The method of claim 1, wherein downloading the Internet data comprises downloading a web page.

5. The method of claim 4, wherein aggregating the web page comprises creating a browser instance in the cloud proxy, the browser instance having a web address associated with the web page.

6. The method of claim 4, wherein downloading the web page comprises downloading the unique objects from a plurality of servers.

7. The method of claim 1, wherein the mobile device provides an Internet connection for a client device in the mobile network, and wherein the application is stored on the client device.

8. A method for managing data communication of a mobile device in a mobile network, comprising:
receiving from a client proxy a request at an assembler stored on the mobile device, the request originating from a web browser;
determining if the request is for a new web page or an unique object of a previously requested web page;
if the request is for the new web page, forwarding the request to a cloud proxy;
if the additional request is for a unique object of a previously requested web page, determining whether the assembler has received a transmission containing the unique object of the previously requested web page; and
if it is determined that the assembler has not received the unique object of the previously requested web page, preventing only requests for the unique object of the previously requested web page from being communicated to the cloud proxy until transmission is received at the assembler containing the unique object of the previously requested web page.

9. The method of claim 8, wherein the client proxy is stored on the mobile device.

10. The method of claim 8, further comprising:
temporarily storing an additional unique object received from the previously requested web page; and
serving the additional unique object upon receipt of a request for the additional unique object from the web browser.

11. A mobile network, comprising:
a client device comprising an application;
a mobile device in communication with the client device; and
a cloud proxy in communication with the mobile device, the cloud proxy comprising:
at least one processor; and
a memory comprising program instructions that, when executed by the at least one processor, cause the at least one processor to:
receive a first request from the application to retrieve Internet data having a plurality of unique objects;
aggregate the Internet data and two or more of the unique objects from the Internet;
forward the Internet data and the two or more unique objects to the client device in one transmission;
receive a second request to retrieve Internet data;
determine if the second request is for a new web page or a unique object of a previously requested web page;
forward the second request to the cloud proxy if the second request is for a new web page;
if the second request is for a unique object of a previously requested web page, determining whether the assembler has received a transmission containing the unique object of the previously requested web page; and
if it is determined that the assembler has not received the unique object of the previously requested web page, preventing only requests for the unique object of the previously requested web page from being communicated to the cloud proxy until a transmission is received at the assembler containing the unique object of the previously requested web page.

12. The mobile network of claim 11, wherein the mobile device forwards the first request from the client device to the cloud proxy.

13. The mobile network of claim 11, wherein the mobile device provides an Internet connection for the client device.

14. The mobile network of claim 11, wherein the plurality of unique objects are downloaded from a plurality of servers.

15. The mobile network of claim 11, wherein the program instructions configured to download the Internet data comprises program instructions configured to download a web page.

16. The mobile network of claim 11, wherein the application is a web browser stored on the client device.

17. The mobile network of claim 11, wherein the cloud proxy sends the unique object from the second request along with one or more additional unique objects and Internet data to the mobile device in one transmission.

18. The mobile network of claim 12, wherein the cloud proxy sends the Internet data and the two or more unique objects to the mobile device and the mobile device forwards, in one transmission, the Internet data and the two or more unique objects to the client device.

19. The mobile network of claim 11, wherein the mobile device maintains a Hypertext Transfer Protocol persistent connection with the cloud proxy.

20. The mobile network of claim 11, wherein aggregating the Internet data comprises creating a browser instance in the cloud proxy, the browser instance having a web address associated with a web page.

* * * * *